E. HOLMES.

Electric Circuit-Breaking Clock.

No. 9,209. Reissued May 18, 1880.

*Witnesses:*
Thomas E. Birch
E. P. Jessup.

*Inventor.*
Edwin Holmes
by his Attorney,
Edwin H. Brown.

UNITED STATES PATENT OFFICE.

EDWIN HOLMES, OF BROOKLYN, NEW YORK.

ELECTRIC-CIRCUIT-BREAKING CLOCK.

SPECIFICATION forming part of Reissued Letters Patent No. 9,209, dated May 18, 1880.

Original No. 63,158, dated March 26, 1867. Application for reissue filed December 26, 1879.

*To all whom it may concern:*

Be it known that I, EDWIN HOLMES, formerly of the city, county, and State of New York, but now of Brooklyn, in Kings county and State of New York, have invented certain new and useful Improvements in Electric Apparatus; and I do hereby declare the same to be fully described in the following specification.

An important object of my invention is to provide an automatic device for breaking or closing the circuit of an electro-magnetic-alarm apparatus, principally so that at an early period in the morning, just previous to the time necessary for opening a house, or one of the windows or doors thereof, included in the circuit, or to which the circuit may be applied, the sounding of the alarm by the opening of such window or door will be prevented, and persons in the house whom the alarm, if sounded, might awaken can remain asleep, but also so that the alarm may be kept inactive through any desired period, and may be rendered active again at any desired time without requiring manipulation or attention, unless it be for the setting of the device suitably to effect the breaking and closing of the circuit at the desired hours.

To these ends my invention consists in the combination, with an electro-magnetic-alarm apparatus, of a clock circuit breaker or closer, or circuit breaker and closer.

It also consists in the combination, with an electro-magnetic-alarm apparatus, of a clock or time-piece and a device (preferably adjustable) for breaking or closing, or for both breaking and closing, the electric circuit, so as to preclude the operation of the alarm after a certain time and during any desirable period, or to render the alarm susceptible of operation at and after a certain time, or to both preclude the operation of the alarm at a certain time and render it susceptible of operation at another time.

It also consists in details of construction, to be hereinafter explained.

Figure 1:
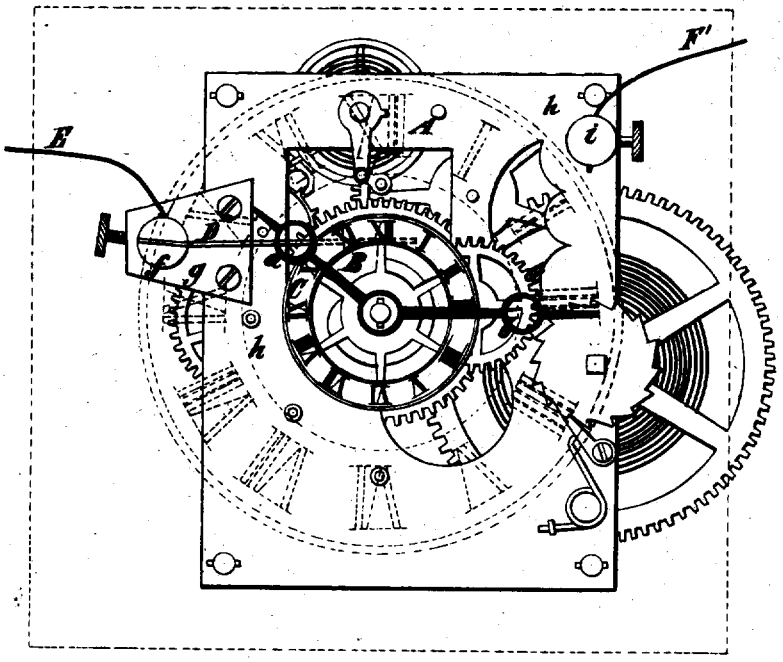
Figure 2:
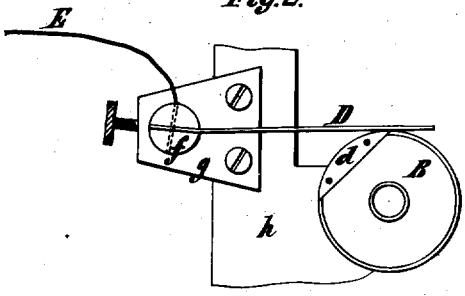
Figure 3:
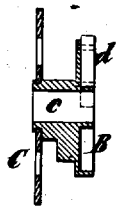

Figure 1 is a front elevation of a clock or time-piece comprising or controlling circuit breaking or closing apparatus and embodying my invention, the face and hour-denoting figures or characters of the clock being exhibited in dotted lines. Fig. 2 is a section of parts or devices comprised in or controlled by the clock or time-piece, and Fig. 3 is a vertical and transverse section of a circuit-controlling wheel and an adjusting-wheel therefor.

Similar letters of reference designate corresponding parts in all the figures.

A designates a clock, which may be of ordinary construction, and provided with an hour-hand, *a*, and a minute-hand, *b*. On the arbor of the hour-hand *a*, and concentrically therewith, I arrange what may be termed a "circuit-controlling wheel," B, which is preferably provided with an adjusting-wheel, C, on whose face may be marked figures or signs indicative of twelve hours. I have shown this adjusting-wheel connected to the circuit-controlling wheel B by a short tubular shaft, *c*, fitting upon the hour-hand arbor.

A portion of the periphery of the wheel B—such, for instance, as that marked *d*—is a non-conductor of electricity, but the remainder of it is made of material, such as metal, forming a conductor of electricity.

On the periphery of the wheel B bears a device forming a conductor of electricity, and shown as consisting of a metallic spring, D, extending from a circuit-wire screw-connection, *f*, projecting from an arm or bracket, *g*, which is secured or fixed to the metallic frame *h* of the clock, and should be a non-conductor of electricity.

One of the battery-wires (marked E) of the circuit leads into and is to be affixed to the connection *f*. The continuation of the circuit is by a wire, F′, shown as leading from another screw-connection, *i*, fixed to the frame *h*.

While the spring or device D is in contact with the metallic part of the periphery of the circuit-controlling wheel B the circuit will be closed; but as soon as it comes into and while it may remain in contact with the part *d* the circuit will be broken or open.

When the hour-mark XII of the adjusting-wheel is in its highest position the device D should be in contact with the extremity of the part *d*.

The circuit-controlling wheel B and its adjusting-wheel should be so combined with the arbor of the hour-hand that they may engage therewith at any point—as, for instance, by friction—so as to be carried around or revolved by it, and may be turned at other times on and independently of the arbor in order to adjust the part *d* with reference to the hour-hand.

In order to set the circuit-controlling wheel B so as to cause the circuit to be broken or closed at any particular hour, the number or character designating such hour on the adjusting-wheel C should be brought around into juxtaposition with the hour-hand, and when the hour-hand reaches that particular hour on the dial the part *d* will be brought into contact with the spring and the circuit will be broken, and at a certain later time the conducting part of the wheel will be brought into contact with the device D, and the circuit will be closed.

The circuit-controlling wheel may obviously be adjusted relatively to the hour-hand to provide for either breaking or closing the circuit, and it may obviously control both the breaking and closing of the circuit.

What I claim as my invention, and desire to secure by Letters Patent, is—

1. The combination, with an electro-magnetic-alarm apparatus, of a clock circuit-breaker.

2. The combination, with an electro-magnetic-alarm apparatus, of a clock circuit-closer.

3. The combination, with an electro-magnetic-alarm apparatus, of a clock circuit breaker and closer.

4. The combination, with an electro-magnetic-alarm apparatus, of a clock or time-piece and device for effecting the breaking of the electric circuit at a predetermined time.

5. The combination, with an electro-magnetic-alarm apparatus, of a clock or time-piece and a device for effecting the closing of the electric circuit at a predetermined time.

6. The combination, with an electro-magnetic-alarm apparatus, of a clock or time-piece and a device for effecting the breaking and closing of the electric circuit at predetermined times.

7. The combination, with an electro-magnetic-alarm apparatus, of a clock or time-piece and an adjustable device for effecting the breaking of the electric circuit at any desired time.

8. The combination, with an electro-magnetic-alarm apparatus, of a clock or time-piece and an adjustable device for effecting the closing of the electric circuit at any desired time.

9. The combination, with an electro-magnetic-alarm apparatus, of a clock or time-piece and an adjustable device for effecting the breaking and closing of the electric circuit at any desired time.

10. The combination as well as the arrangement of the circuit-controller B, its adjuster C, and the spring D with a clock or time-piece, A, and an electric or electro-magnetic circuit, the whole being substantially as and for the purpose hereinbefore specified.

EDWIN HOLMES.

Witnesses:
H. F. NEWBURY,
JAS. TOUMEY.